US009451301B2

(12) United States Patent
Guan et al.

(10) Patent No.: US 9,451,301 B2
(45) Date of Patent: Sep. 20, 2016

(54) METHOD FOR MAPPING RESOURCES OF BROADCAST CONTROL CHANNEL

(75) Inventors: Yanfeng Guan, Guangdong (CN); Xiangyu Liu, Guangdong (CN); Huiying Fang, Guangdong (CN); Changyin Sun, Guangdong (CN); Ying Liu, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 1279 days.

(21) Appl. No.: 13/377,513

(22) PCT Filed: May 17, 2010

(86) PCT No.: PCT/CN2010/072829
§ 371 (c)(1),
(2), (4) Date: Dec. 9, 2011

(87) PCT Pub. No.: WO2010/142191
PCT Pub. Date: Dec. 16, 2010

(65) Prior Publication Data
US 2012/0093115 A1    Apr. 19, 2012

(30) Foreign Application Priority Data
Jun. 11, 2009 (CN) .......................... 2009 1 0149022

(51) Int. Cl.
*H04J 1/08* (2006.01)
*H04N 21/2383* (2011.01)
*H04L 5/00* (2006.01)

(52) U.S. Cl.
CPC .......... *H04N 21/2383* (2013.01); *H04L 5/003* (2013.01); *H04L 5/0007* (2013.01)

(58) Field of Classification Search
USPC ....... 370/252, 254, 312, 328–330, 431, 432, 370/437
See application file for complete search history.

(56) References Cited

U.S. PATENT DOCUMENTS 6,438,361 B1 *  8/2002  Chong et al. .............. 455/188.1
2007/0268900 A1 * 11/2007  Park et al. .................... 370/390
(Continued)

FOREIGN PATENT DOCUMENTS

| CN | 101001125 A | 7/2007 |
| CN | 101242625 A | 8/2008 |

(Continued)

OTHER PUBLICATIONS

International Search Report dated Sep. 2, 2010 for PCT/CN2010/072829, filed May 17, 2010.
(Continued)

*Primary Examiner* — Yemane Mesfin
*Assistant Examiner* — Mon Cheri Davenport
(74) *Attorney, Agent, or Firm* — Knobbe, Martens, Olson & Bear, LLP

(57) ABSTRACT

A method for mapping resources of broadcast control channel is disclosed. Available subcarriers of a subframe in which the broadcast control channel is located are divided into three subcarrier sets, each of which is mapped to be one frequency partition, so that the subframe in which the broadcast control channel is located includes N frequency partitions, and resources of each frequency partition are mapped to be logical resource units, wherein N can be 1 or 3. With this method, subcarrier sets of the broadcast control channel are divided, and the resources of the broadcast control channel are mapped.

12 Claims, 11 Drawing Sheets

(56) References Cited

U.S. PATENT DOCUMENTS

2008/0081603 A1* 4/2008 Cho et al. .................. 455/422.1
2008/0176577 A1* 7/2008 Bourlas .................. H04L 5/023
                                                               455/454

FOREIGN PATENT DOCUMENTS

| | | |
|---|---|---|
| CN | 101399761 A | 4/2009 |
| EP | 2 312 879 A1 | 4/2011 |
| EP | 2 355 607 A1 | 8/2011 |
| EP | 2 373 106 A1 | 10/2011 |
| EP | 2 384 041 A1 | 11/2011 |
| EP | 2 418 899 A1 | 2/2012 |
| WO | WO 02/17615 A2 | 2/2002 |
| WO | WO 2008/100209 A1 | 8/2008 |
| WO | WO 2008/113048 A1 | 9/2008 |
| WO | WO 2010/000853 A2 | 1/2010 |

OTHER PUBLICATIONS

International Report on Patentability and Written Opinion dated Dec. 12, 2011 for PCT/CN2010/072829, filed May 17, 2010.
Ahmadi, S., 2009: "An Overview of Next-Generation Mobile WiMAX Technology", *IEEE Communications Magazine*, vol. 47, No. 6, pp. 84-98.
Stevenson C et al., 2009: "IEEE 802.22: The First Cognitive Radio Wireless Regional Area Network Standard", *IEEE Communications Magazine*, vol. 47, No. 1, pp. 130-138.
European Search Report dated Feb. 21, 2013 for Application No. 10785704.7 in 9 pages.
Cudak et al. "Proposed text of UL PHY structure for the IEEE 802.16m amendment" (date submitted Nov. 3, 2008) in 19 pages.
Choi et al. "BCH Resource Allocation for IEEE 802.16m" (date submitted Jan. 5, 2009) in 8 pages.
Japanese Office Action in Japanese Application No. 2012-514331 in 2 pages.
Yanfeng et al. "Proposed amendment text on 802.16m Downlink Physical Structure" (date submitted Nov. 3, 2008) in 6 pages.
Yuk et al. "Considerations on Sunframe MAP Design" (date submitted May 9, 2009) in 12 pages.
Chinese Office Action in Application No. 200910149022.3 dated Aug. 15, 2013 in 11 pages.

* cited by examiner

METHOD FOR MAPPING RESOURCES OF BROADCAST CONTROL CHANNEL

CROSS-REFERENCE TO RELATED APPLICATIONS

This application is the U.S. National Phase application under 35 U.S.C. §371 of International Application PCT/CN2010/072829 filed May 17, 2010, which claims priority to Chinese Application 200910149022.3 filed Jun. 11, 2009.

FIELD OF THE INVENTION

The present invention relates to communication field, and in particular to a method for mapping resources of broadcast control channel.

BACKGROUND OF THE INVENTION

In a radio communication system, a base station communicates with an equipment via an uplink/downlink, wherein the downlink (forward direction) is a direction from the base station to the terminal, and uplink (reverse direction) is a direction from the terminal to the base station. In general application, a plurality of terminals can send data to the base station via the uplinks simultaneously, and also can receive data from the base station via the downlinks simultaneously.

In a radio communication system based on Orthogonal Frequency Division Multiple Access ("OFDMA" for short) technology, a base station maps and allocates radio resources, while users realize multiple access by occupying different subcarriers. For instance, a base station provides system configuration and resource allocation information in downlink transmission from the base station to terminals, and system configuration and resource allocation information in uplink transmission from the terminals to the base station, etc. The system configuration and resource allocation information usually are sent by a control channel, and the terminals receive the information via a determined control channel for sending and receiving data and communication with the base station.

In the radio communication system, system information is sent mainly via Synchronization Channel ("SCH" for short) and Broadcast Control Channel ("BCCH" for short). The synchronization channel and the broadcast control channel are "point-to-multipoint" one-way control channels. The synchronization channel serves the main function of providing to the terminal the temporal correction and the frequency during the initial access and simultaneously carrying a small amount of system information. The broadcast control channel serves the main function of allowing the base station broadcasting to the terminal necessary system configuration and control information that indicates the control structure of the whole system, and especially indicates mapping and configuring condition of the system resources. As a result, only when the terminal correctly decodes the synchronization channel and the broadcast control channel and obtains necessary system configuration and control information, it can access the base station, and further performs data transmission. However, the terminal does not obtain the resource mapping information before decoding the broadcast control channel, and in order to assure a synchronous signal to be capable of serving an auxiliary function for decoding the broadcast control channel, the resource structure of the synchronization channel should be taken into consideration in mapping resources of the broadcast control channel.

Therefore, an effective method for mapping the resources of the broadcast control channel is needed.

SUMMARY OF THE INVENTION

The present invention is proposed upon considering the need for a method for mapping resources in the related art, and thus an improved method for mapping resources of broadcast control channel is provided to map the resources of the broadcast control channel.

In order to achieve the objective, a method for mapping resources of broadcast control channel is provided according to one aspect of the present invention. Available subcarriers of a subframe in which the broadcast control channel is located are divided into three subcarrier sets, each of which is mapped to be one frequency partition, so that the subframe in which the broadcast control channel is located comprises three frequency partitions, and resources of each frequency partition are mapped to be logical resource units.

Preferably, the available subcarriers are divided into the three subcarrier sets in one of following manners: dividing the available subcarriers into a plurality of subblocks by taking N subcarriers as a unit, and performing an equal interval extraction on subcarriers of each subblock to form the three subcarrier sets, wherein N is a natural number greater than 1; and dividing the available subcarriers into the three subcarrier sets according to a permutation sequence.

Preferably, the available subcarriers are divided into the three subcarrier sets in a manner as follow: equally dividing the available subcarriers to form the three subcarrier sets.

Preferably, the dividing method for the three subcarrier sets is the same as a dividing method for three subcarrier sets in secondary synchronization channel.

Preferably, the dividing method for the three subcarrier sets is different from a dividing method for three subcarrier sets in secondary synchronization channel.

Preferably, the logical resource units are distributed resource units. the step of resources of each frequency partition being Mapped to the logical resource units comprises:

dividing subcarriers in each subcarrier set into physical resource units and performing at least one of the following operations on the physical resource units to obtain the logical resource units: miniband permutation and subcarrier permutation; and alternatively, performing a subcarrier permutation on the subcarriers in each subcarrier set to obtain the logical resource units.

Preferably, the logical resource units are distributed resource units and continuous resource units. The step of resources of each frequency partition being mapped to the logical resource units comprises: dividing subcarriers in each subcarrier set into physical resource units and performing at least one of the following operations on the physical resource units to obtain the logical resource units: miniband permutation, continuous resource unit/distributed resource unit allocation and subcarrier permutation.

Preferably, after the step of resources of each frequency partition being mapped to the logical resource units, the method further comprises: in terms of each frequency partition, occupying by the broadcast control channel a plurality of the distributed resource units starting from the lowest distributed resource unit index in each frequency partition, wherein the broadcast control channel comprises a primary broadcast control channel and a secondary broadcast control channel, wherein the primary broadcast control channel occupies the distributed resource units in a fixed number, and the number of the distributed resource units occupied by the secondary broadcast control channel is indicated in the primary broadcast control channel.

Preferably, the resource units in each frequency partition except for the resource units occupied by the broadcast control channel are configured to transmit control information and/or data, wherein if the resource units in each frequency partition except for the resource units occupied by the broadcast control channel are only used to transmit the data, then the control information is transmitted in a subframe in front of the subframe in which the broadcast control channel is located.

In order to achieve the objective above, a method for mapping resources of broadcast control channel is provided according to another aspect of the present invention. Available subcarriers of a subframe in which the broadcast control channel is located are taken as one subcarrier set, and the subcarrier set is mapped to be one frequency partition, so that the subframe in which the broadcast control channel is located comprises one frequency partition, and resources in the frequency partition are mapped to be logical resource units.

Preferably, the logical resource units are distributed resource units. The step of resources of each frequency partition being mapped to the logical resource units comprises: dividing subcarriers in the subcarrier set into physical resource units and performing at least one of the following operations on the physical resource units to obtain the logical resource units: miniband permutation and subcarrier permutation; and alternatively, performing a subcarrier permutation on the subcarriers in the subcarrier set to obtain the logical resource units.

Preferably, the logical resource units are distributed resource units and continuous resource units. Mapping resources of each frequency partition to be the logical resource units comprises: dividing subcarriers in the subcarrier set into physical resource units and performing at least one of the following operations on the physical resource units to obtain the logical resource units: miniband permutation, continuous resource unit/distributed resource unit allocation and subcarrier permutation.

Preferably, after the step of resources of each frequency partition being mapped to the logical resource units, the method further comprises: occupying by the broadcast control channel a plurality of the distributed resource units starting from the lowest distributed resource unit index in the frequency partition, wherein the broadcast control channel comprises a primary broadcast control channel and a secondary broadcast control channel, wherein the primary broadcast control channel occupies the distributed resource units in a fixed number, and the number of the distributed resource units occupied by the secondary broadcast control channel is indicated in the primary broadcast control channel.

Preferably, resource units except for the resource units occupied by the broadcast control channel are configured to transmit control information and/or data, wherein if the resource units except for the resource units occupied by the broadcast control channel are only used to transmit the data, then the control information is transmitted in a subframe in front of the subframe in which the broadcast control channel is located.

In terms of the present invention, the subcarrier sets of the broadcast control channel are divided, and the resources of the broadcast control channel are mapped.

Other features and advantages of the present invention will be illustrated in the following description and partially become obvious from the description, or be understood by implementing the present invention. The objects and other merits of the present invention can be accomplished and obtained via the structures particularly indicated in the description, claims and accompanying drawings.

BRIEF DESCRIPTION OF THE DRAWINGS

The drawings, constituting a part of the description for further understanding the present invention, are used to explain the present invention together with embodiments of the present invention without unduly limiting the scope of the present invention, wherein.

DETAILED DESCRIPTION OF EMBODIMENTS

Compared with a data channel, a synchronization channel and a broadcast control channel demand high coverage rate and high robustness in transmission. The broadcast control channel usually resists a bad channel fading at a relatively low encoding rate, for instance, 1/24 encoding rate is used for assuring a terminal to be still capable of performing correct decoding in a bad channel environment, but a lot of radio resources are consumed, so the problem of making a balance between performances and resources exists in configuration of the broadcast control channel. Moreover, the synchronization channel and the broadcast control channel generally occupy determined resource positions and use fixed transmission methods to assure the terminal to be capable of quickly decoding before receiving system information the synchronization channel and the broadcast control channel for reducing the system configuration complexity and the time delay of a terminal access. Apart from factors above, mapping the resources of a control channel in a communication system is also associated with Fractional Frequency Reuse ("FFR" for short) method, and especially in a communication system based on OFDMA, radio resources thereof are two-dimensional time-frequency resources consisting of time domain symbols and frequency domain subcarriers, and resources thereof are mapped in time domain and frequency domain, and the frequency reuse method is quite complex. In sum, a balance should be achieved on key factors such as interference inhibition and resource efficiency and so on for configuration of the control channel, and especially the configuration of the broadcast control channel.

A technology relating to the resource mapping is provided according to an embodiment of the present invention. The so-called resource mapping means a process and a method for mapping physical resources (e.g., physical subcarriers) to be logical resources (e.g., logical resource units). Resource mapping of the broadcast control channel means resource mapping of radio resources (e.g., OFDM symbols occupied) of a subframe in which the broadcast control channel is located. In an embodiment of the present invention, a subframe in which a broadcast control channel is located consists of M frequency partitions, and resources of each frequency partition are mapped to be logical resource units, wherein M can be 3 or 1. The frequency partition can be formed in a way as follows: preferably, available subcarriers of the subframe in which the broadcast control channel is located are divided into three subcarrier sets, each of which is mapped to be one frequency partition.

Next, preferred embodiments of the present invention will be illustrated in detail with reference to the drawings, and the embodiments of the present invention and features therein can be combined with each other if no conflict exists.

Figure 1:
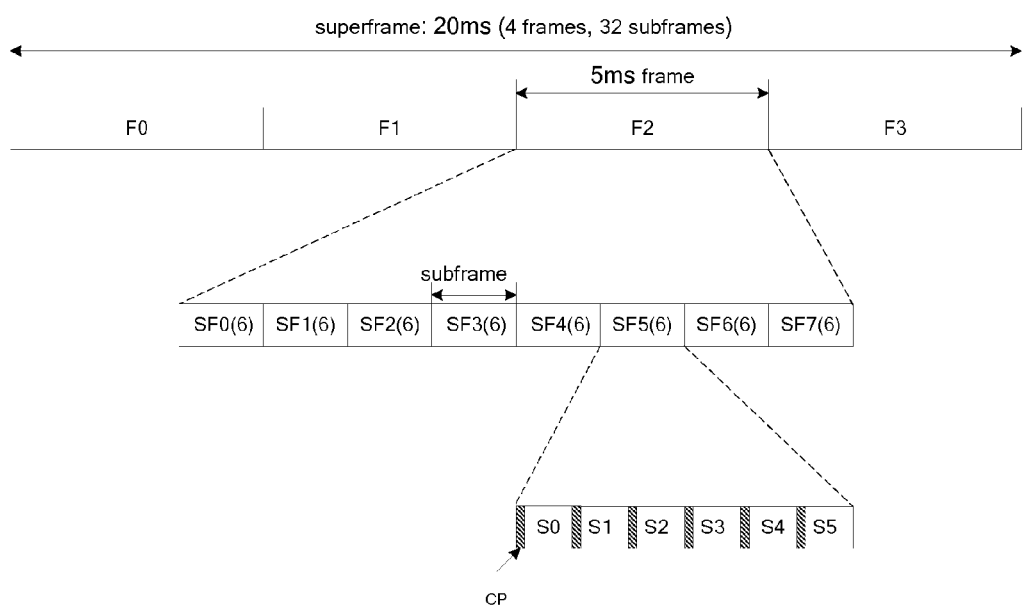
FIG. 1 is a schematic structural diagram of a basic frame of a radio communication system according to related art.
Figure 2:
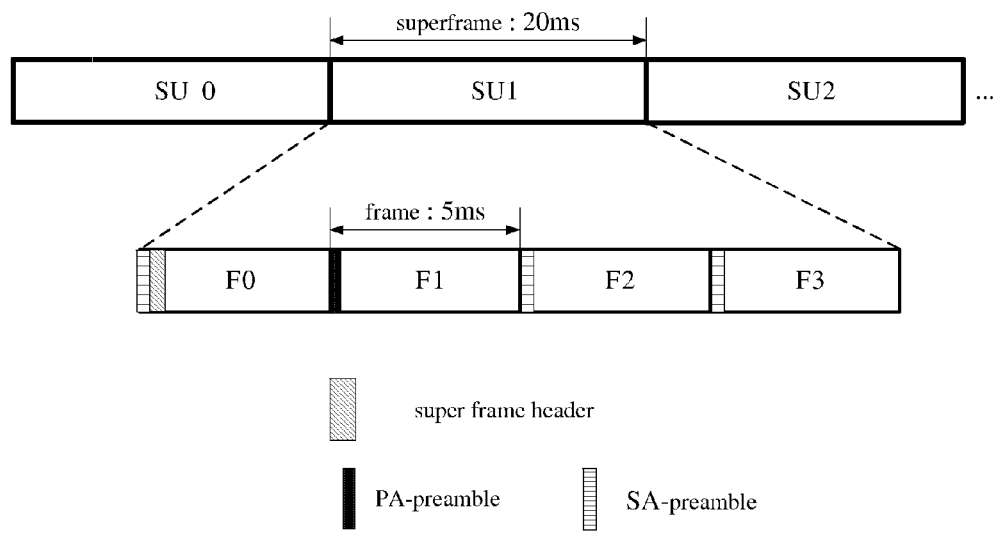
FIG. 2 is a schematic diagram of a control structure of a radio communication system according to related art.

As shown in FIG. 1, radio resources are divided into superframes (superframe 20 ms) in a time domain, each superframe consists of four frames, each frame consists of eight subframes, and a subframe consists of six basic OFDM symbols. A communication system determines the number of OFDM symbols in every level in a frame structure according to the factors such as speed, rate and service type and so on of a terminal that practically needs to be supported. As shown in FIG. 2, a synchronization channel is located in an initial OFDM symbol in each frame, and for a layered synchronization channel structure using primary synchronization and secondary synchronization, a superframe head is located behind the secondary synchronization. The following embodiments can be based on the frame structure and a control structure of a radio communication system of the OFDMA technology.

In the following embodiments, in a control channel scene, the Broadcast Control Channel ("BCCH" for short) can be abbreviated as Broadcast Channel ("BCH" for short). In addition, as the broadcast control channel is usually sent in a head of the superframe or a first subframe of the superframe, the broadcast control channel is also called Super Frame Header ("SFH" for short), the primary broadcast control channel is also called Primary Super Frame Header ("P-SFH" for short), and a secondary broadcast control channel is also called Secondary Super Frame Header ("S-SFH" for short). The available subcarriers mentioned below refer to the subcarriers from which guard subcarriers and DC carriers are removed among subcarriers. Moreover, the available subcarriers are physical available subcarriers.

In an OFDMA/5 MHz system mentioned in the following embodiments, the point number of Fast Fourier transform (FFT) is 512, and the available subcarriers are 432 when the guard subcarriers and DC carriers are removed. In an OFDMA/10 MHz system, the point number of the FFT of the MHz system is 1042, and the available subcarriers are 864 when the guard subcarriers and DC carriers are removed.

Formation of Subcarrier Sets

Embodiment 1

In this embodiment, the frequency reuse factor of a SFH is 3, i.e., available subcarriers of a subframe in which the SFH is located are divided into three subcarrier sets. The methods for dividing the sets at least can include the following: (1) equal interval extraction: dividing the available subcarriers into a plurality of subblocks by taking multiple subcarriers as a unit, and performing the equal interval extraction on subcarriers of each subblock to form the three subcarrier sets, wherein preferably, an offset between a initial subcarrier and a first subcarrier of the subblock is M subcarriers when the equal interval extraction is performed in the subblock, and offsets in different subblocks can be the same or not, wherein M is a nonnegative integer; (2) dividing the available subcarriers into the three subcarrier sets according to a specific permutation sequence; and (3) equally dividing the available subcarriers into the three subcarrier sets. The above dividing methods for the subcarrier sets can be the same as, or different from, the dividing methods for three subcarrier sets in a secondary synchronization channel, for instance, the subcarrier sets formed through the manner (3) are different from the three subcarrier sets in the secondary synchronization channel.

Example 1

Figure 3:
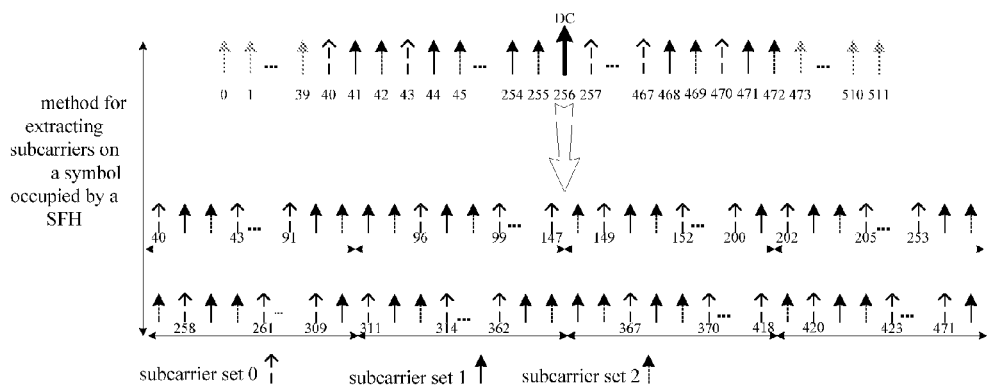
FIG. 3 is a schematic diagram of Embodiment 1 of a method for dividing subcarrier sets based on an OFDM/5 MHz system according to an embodiment of the present invention.

FIG. 3 shows a method for dividing subcarrier sets of a subframe in which an SFH is located in an OFDM/5 MHz system. As show in FIG. 3, 432 available physical subcarriers are divided into eight subblocks by taking 54 subcarriers as a unit, and an equal interval extraction is performed on subcarriers of each of the eight subblocks by taking {0, 2, 1, 0, 1, 0, 2, 1} subcarriers as an offset to form three subcarrier sets.

Specifically as shown in FIG. 3, the three sets obtained by extracting the subcarriers are as follows:

$SubcarrierSet_0 = \{$ 40 43 46 49 52 55 58 61 64

67 70 73 76 79 82 85 88 91 96 99 102
105 108 111 114 117 120 123 126 129 132 135 138
141 144 147 149 152 155 158 161 164 167 170 173
176 179 182 185 188 191 194 197 200 202 205 208
211 214 217 220 223 226 229 232 235 238 241 244
247 250 253 258 261 264 267 270 273 276 279 282
285 288 291 294 297 300 303 306 309 311 314 317
320 323 326 329 332 335 338 341 344 347 350 353
356 359 362 367 370 373 376 379 382 385 388 391
394 397 400 403 406 409 412 415 418 420 423 426
429 432 435 438 441 444 447 450 453 456 459 462
465 468 471$\}$,

-continued

SubcarrierSet₁ = {41  44  47  50  53  56  59  62  65
68  71  74  77  80  83  86  89  92  94  97  100
103  106  109  112  115  118  121  124  127  130  133  136
139  142  145  150  153  156  159  162  165  168  171  174
177  180  183  186  189  192  195  198  201  203  206  209
212  215  218  221  224  227  230  233  236  239  242  245
248  251  254  259  262  265  268  271  274  277  280  283
286  289  292  295  298  301  304  307  310  312  315  318
321  324  327  330  333  336  339  342  345  348  351  354
357  360  363       365  368  371  374  377  380  383  386
389  392  395  398  401  404  407  410  413  416  421  424
427  430  433  436  439  442  445  448  451  454  457  460
463  466  469  472}, and SubcarrierSet₂ = {42  45  48  51  54  57  60  63  66
69  72  75  78  81  84  87  90  93  95  98  101
104  107  110  113  116  119  122  125  128  131  134  137
140  143  146  148  151  154  157  160  163  166  169  172
175  178  181  184  187  190  193  196  199  204  207  210
213  216  219  222  225  228  231  234  237  240  243  246
249  252  255  257  260  263  266  269  272  275  278  281
284  287  290  293  296  299  302  305  308  313  316  319
322  325  328  331  334  337  340  343  346  349  352  355
358  361  364  366  369  372  375  378  381  384  387  390
393  396  399  402  405  408  411  414  417  419  422  425
428  431  434  437  440  443  446  449  452  455  458  461
464  467  470}.

Similarly, in a 10 MHz system, 864 available physical subcarriers can be divided into 16 subblocks by taking 54 subcarriers as a unit, and the equal interval extraction is performed on subcarriers of each of the 16 subblocks by taking {1, 0, 2, 1, 0, 2, 1, 0, 1, 0, 2, 1,0, 2, 1,0} subcarriers as an offset to form three subcarrier sets.

Example 2

Figure 4:
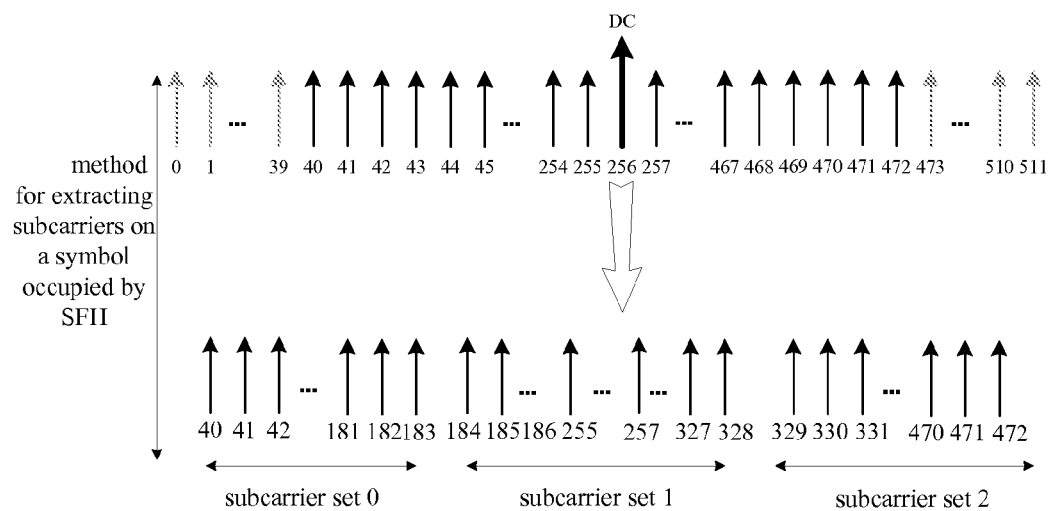
FIG. 4 is a schematic diagram of Embodiment 2 of a method for dividing subcarrier sets based on an OFDM/5 MHz system according to an embodiment of the present invention.

As shown in FIG. 4, available subcarrier in this embodiment are equally divided into three sets, namely, {40, 41, 42, . . . 181, 182, 183}, {184, 185, 186, . . . , 255, 257, . . . , 327, 328} and {329, 330, 331, . . . , 470, 471, 472}, wherein the subcarrier of index 256 is not included in the above sets as it is a DC subcarrier.

In a 10 MHz system, three subcarrier sets also can be equally divided. For instance, available subcarriers are equally divided into three sets, namely, {80, 81, 82, . . . , 365, 366, 367}, {368, 369, . . . , 511, 513, 514, . . . , 655, 656} and {657, 658, 659, . . . , 942, 943, 944}, wherein a subcarrier of index 512 is not included in the above sets as it is a DC subcarrier.

Besides, as mentioned above, apart from the method of equal interval extraction and the method of equal division described in the embodiments above, the available subcarriers also can be divided into three subcarrier sets in a manner according to a specific permutation sequence in formation of the subcarrier sets.

Preferably in Example 1 to Example 2 described above, the three subcarrier sets that the available subcarriers of a subframe in which an SFH is located are divided into, are the same as three subcarrier sets in a secondary synchronization channel. Consequently, system configuration complexity can be reduced, and time delay of a terminal access can be decreased. Of course, if the three subcarrier sets that the subframe in which the SFH is located is divided into are different from the three subcarrier sets in the secondary synchronization channel, no influence will be caused on implementation of the present invention.

Embodiment 2

In this embodiment, the frequency reuse factor of an SFH is 1, i.e., available subcarriers of a subframe in which the SFH is located as a whole are taken as one subcarrier set.

With Embodiment 1 and Embodiment 2 described above, the subcarrier set is divided, providing foundation for subsequent resource mapping process.

It should be particularly indicated that one symbol is taken as an example in Embodiment 1 and Embodiment 2 to illustrate the method for dividing the subcarriers of the subframe in which the SFH is located. If the SFH subframe occupies five symbols, then available subcarriers in total mean available subcarriers on the five symbols, while three subcarrier sets mean that subcarrier set division is performed on each symbol according to the method of Embodiment 1 or Embodiment 2, and further subcarrier sets formed by the subcarriers of all symbols in the subframe in which the SFH is located are divided into physical resource units.

Resource Mapping

A method for mapping resources of a broadcast control channel is further provided according to an embodiment of the present invention. In this method for mapping resources, subcarrier sets resulted from an operation of forming the subcarrier sets above are mapped to be frequency partitions. Specifically, each subcarrier set is mapped to be (corresponding to) one frequency partition. Subsequently, all subcarriers of each frequency partition are mapped to be logical resource units, and preferably, all subcarriers of each frequency partition are mapped to be distributed resource units ("DRU" for short). As an optional solution, the present invention also can be accomplished by mapping part of or all of the subcarriers of the frequency partitions to be distributed resource units and continuous resource units.

Preferably, any one of the following operations can be used for resources of each frequency partition being mapped to the logical resource units: (1) dividing subcarriers in each subcarrier set into physical resource units, and performing at least one of the following operations on the physical resource units to obtain the logical resource units: miniband permutation and subcarrier permutation; (2) performing a subcarrier permutation on the subcarriers in each subcarrier set to obtain the logical resource units; and (3) dividing subcarriers in each subcarrier set into physical resource units and performing at least one of the following operations on the physical resource units to obtain the logical resource units: miniband permutation, continuous resource unit/distributed resource unit allocation and subcarrier permutation.

In the following, the method for mapping resources of broadcast control channel of an embodiment of the present invention will be described in conjunction with examples.

Example 3

Figure 5:
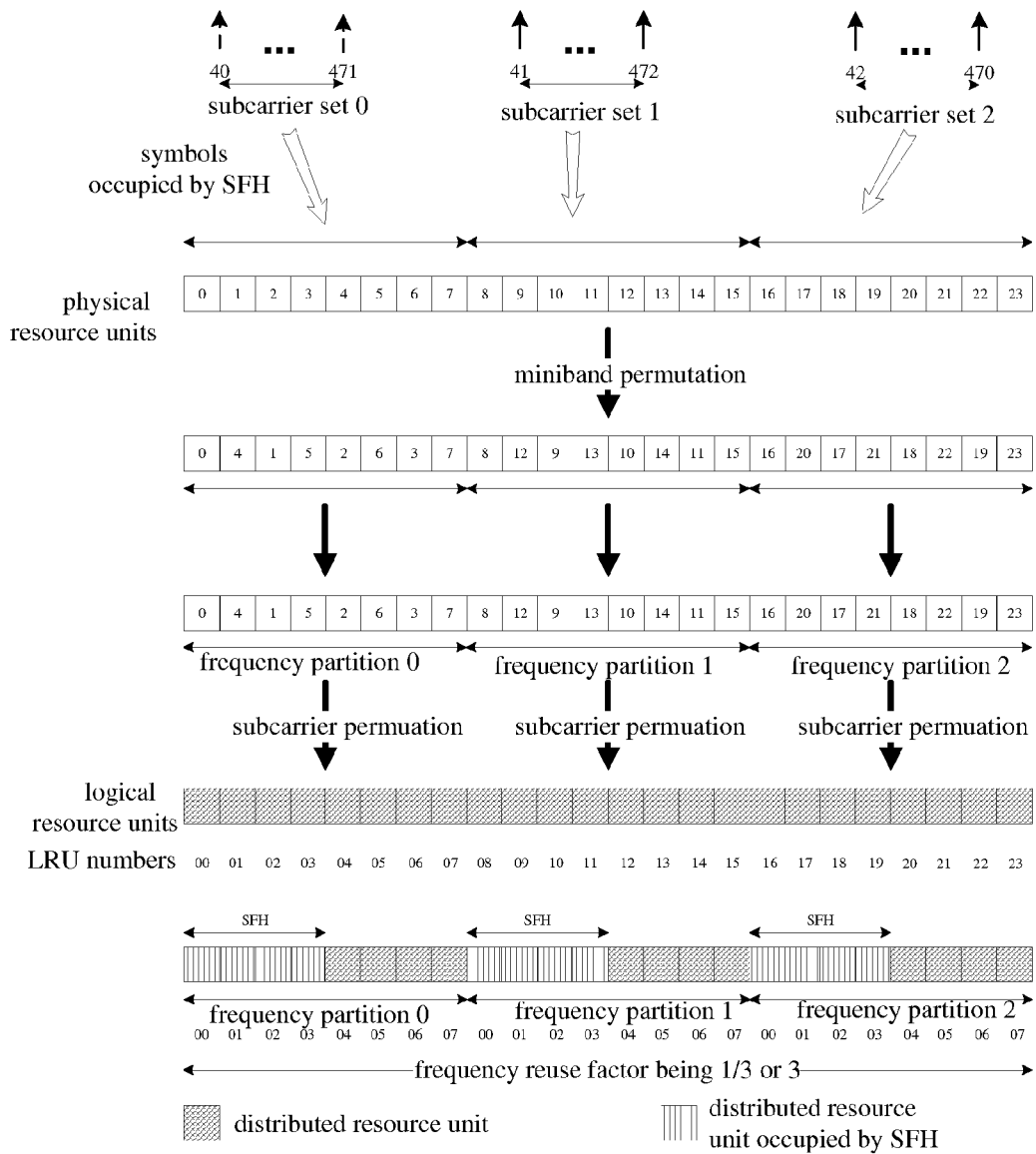
FIG. 5 is a schematic diagram of Embodiment 3 of a method for mapping resources based on an OFDM/5 MHz system when the frequency reuse factor is 3 according to an embodiment of the present invention.

Based on the method for dividing the subcarrier sets in FIG. 3, FIG. 5 shows a process of mapping resources in an OFDMA/5 MHz system.

As mentioned above, in FIG. 3, the available subcarriers are divided into three subcarrier sets—Sub carrier Set₀, Sub carrier Set₁ and Sub carrier Set₂—using the method of Example 1. Next, as shown in FIG. 5, subcarriers in each subcarrier set are mapped to be resource units with the same size as physical resource units, i.e., the subcarriers are mapped to be physical resource units, and the number of symbols occupied by the physical resource units in time domain is the number of symbols occupied by an SFH in time domain. Thereafter, a miniband permutation is performed on the physical resource units to further form the mapped resource units in each subcarrier set into one frequency partition to obtain three frequency partitions such as Frequency Partition 0, Frequency Partition 1 and Frequency Partition 2; and then a subcarrier permutation is performed on resource units in each frequency partition to obtain logical resource units ("LRU" for short), specifically, to obtain distributed resource units.

Preferably, a subband division operation also can be performed before the miniband permutation is performed on the physical resource units.

It can be seen from the process shown in FIG. 5, the three subcarrier sets finally constitute three frequency partitions, wherein the frequency reuse factor thereof is 3, and the SFH (comprising a primary SFH and a secondary SFH) is sent in each frequency partition.

To sum up, a process of mapping the resources in FIG. 5 is accomplished as follows: subcarrier sets—mapped to be physical resource units—miniband permutation—subcarrier permutation—logical resource units (distributed resource units).

Example 4

In order to simplify system designing and accelerate decoding by a terminal, a simplified design can be used for mapping resources of an SFH. Based on the method for dividing the subcarrier sets in FIG. 3, FIG. 6 shows another method for mapping resources in an OFDMA/5 MHz system.

Figure 6:
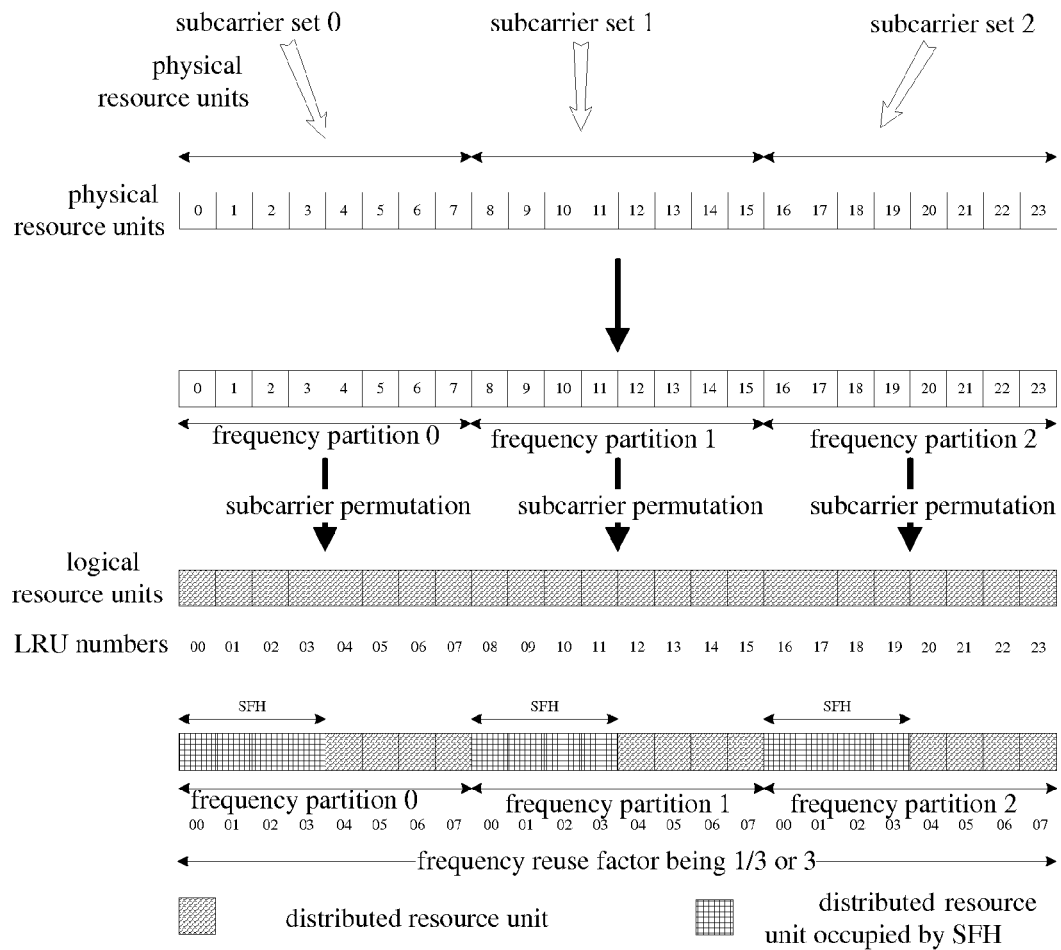
FIG. 6 is a schematic diagram of Embodiment 4 of a method for mapping resources based on an OFDM/5 MHz system when the frequency reuse factor is 3 according to an embodiment of the present invention.

Compared with FIG. 5, a miniband permutation is not needed in a process of mapping the resources shown in FIG. 6. That is, available subcarriers are divided into three subcarrier sets with the method shown in FIG. 3, subcarriers in each subcarrier set are mapped to be physical resource units, further, mapped resource units in each subcarrier sets are formed into one frequency partition, and then a subcarrier permutation is performed on the resource units of each frequency partition to obtain distributed resource units.

To sum up, the process of mapping the resources in FIG. 6 is accomplished as follows: subcarrier sets—mapped to be physical resource units—subcarrier permutation—logical resource units (distributed resource units).

Example 5

Figure 7:
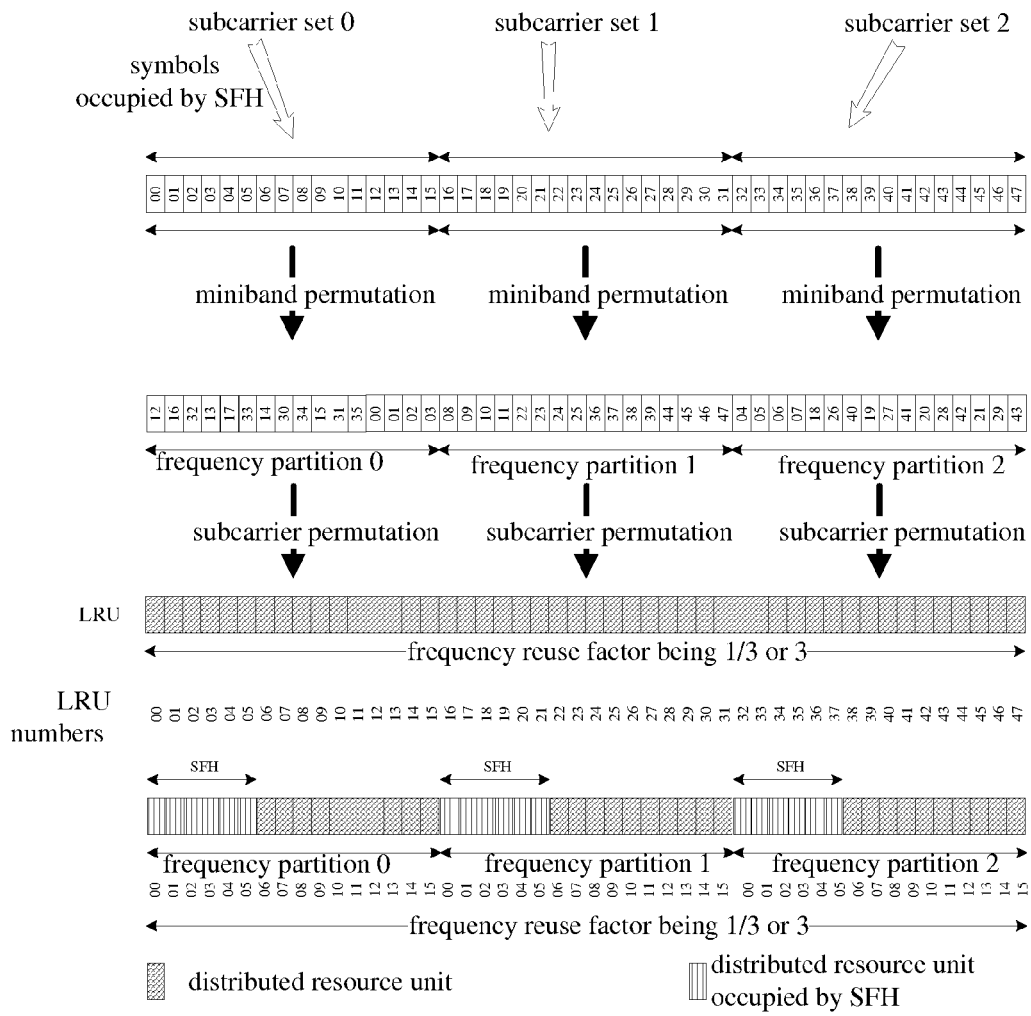
FIG. 7 is a schematic diagram of Embodiment 5 of a method for mapping resources based on an OFDM/10 MHz system when the frequency reuse factor is 3 according to an embodiment of the present invention.

Based on a method for dividing the subcarrier sets similar to that shown in FIG. 3, FIG. 7 shows a process of mapping resources of an SFH in an OFDMA/10 MHz system when the frequency reuse factor is 3.

As shown in FIG. 7, subcarriers in each of three subcarrier sets obtained by an operation of dividing subcarrier sets are mapped to be physical resource units, thereafter, a miniband permutation is performed, further, mapped resource units in each subcarrier set are formed into one frequency partition to obtain three frequency partitions such as Frequency Partition 0, Frequency Partition 1 and Frequency Partition 2, thereafter, a subcarrier permutation is performed on the resource units of each frequency partition to obtain logical resource units, specifically, to obtain distributed resource units. This process is similar to that shown in FIG. 5, and unnecessary details will not be given to similar processing.

Example 6

Figure 8:
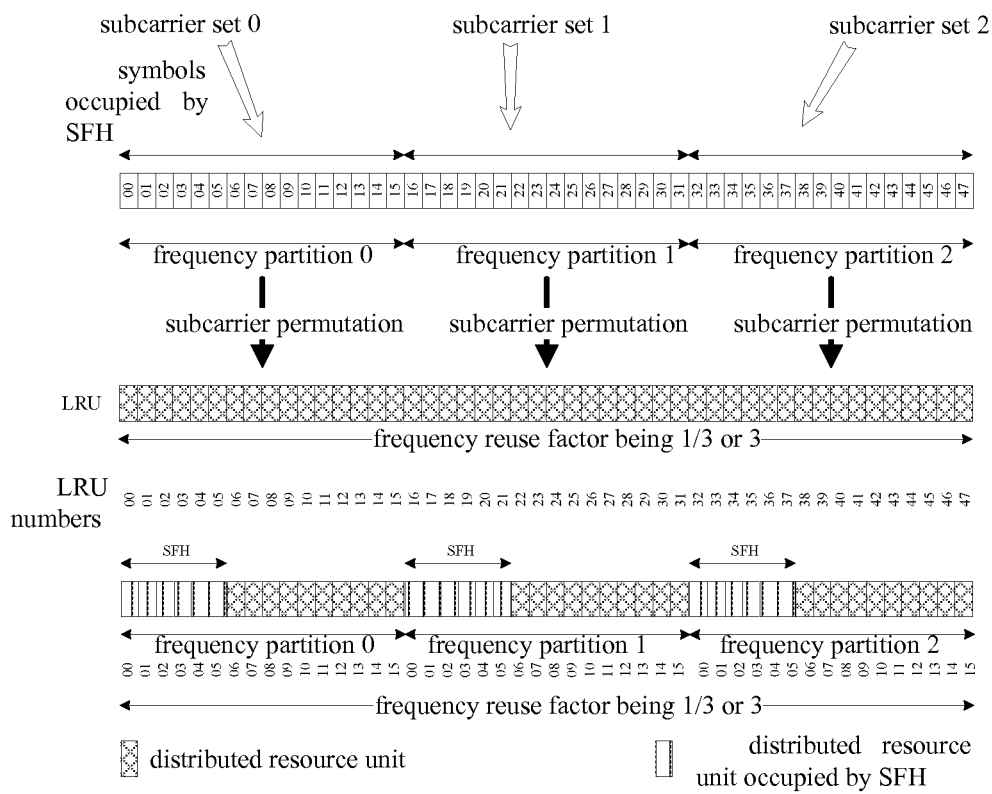
FIG. 8 is a schematic diagram of Embodiment 6 of a method for mapping resources based on an OFDM/10 MHz system when the frequency reuse factor is 3 according to an embodiment of the present invention.

FIG. 8 is another process of mapping resources of an SFH in an OFDM/10 MHz system when the frequency reuse factor is 3.

Compared with FIG. 7, a miniband permutation is not needed in a process of mapping the resources shown in FIG. 8. That is, available subcarriers are divided into three subcarrier sets with the method shown in FIG. 5, subcarriers in each subcarrier set are mapped to be physical resource units, further, mapped resource units in each subcarrier sets are formed into one frequency partition, and then a subcarrier permutation is performed on the resource units of each frequency partition to obtain distributed resource units.

Example 3 to Example 6 described above are directed to the method for mapping resources when the frequency reuse factor is 3. With such method, after the available subcarriers are divided into three subcarrier sets, the physical resource units are mapped to be the logical resource units after a series of processes, and the resources are mapped. Next, a method for mapping resources will be described when the frequency reuse factor is 1, the physical resource units are mapped to be distributed resource units, by one of the following operations or a combination thereof: subband division, miniband permutation and subcarrier permutation.

Example 7

Figure 9:
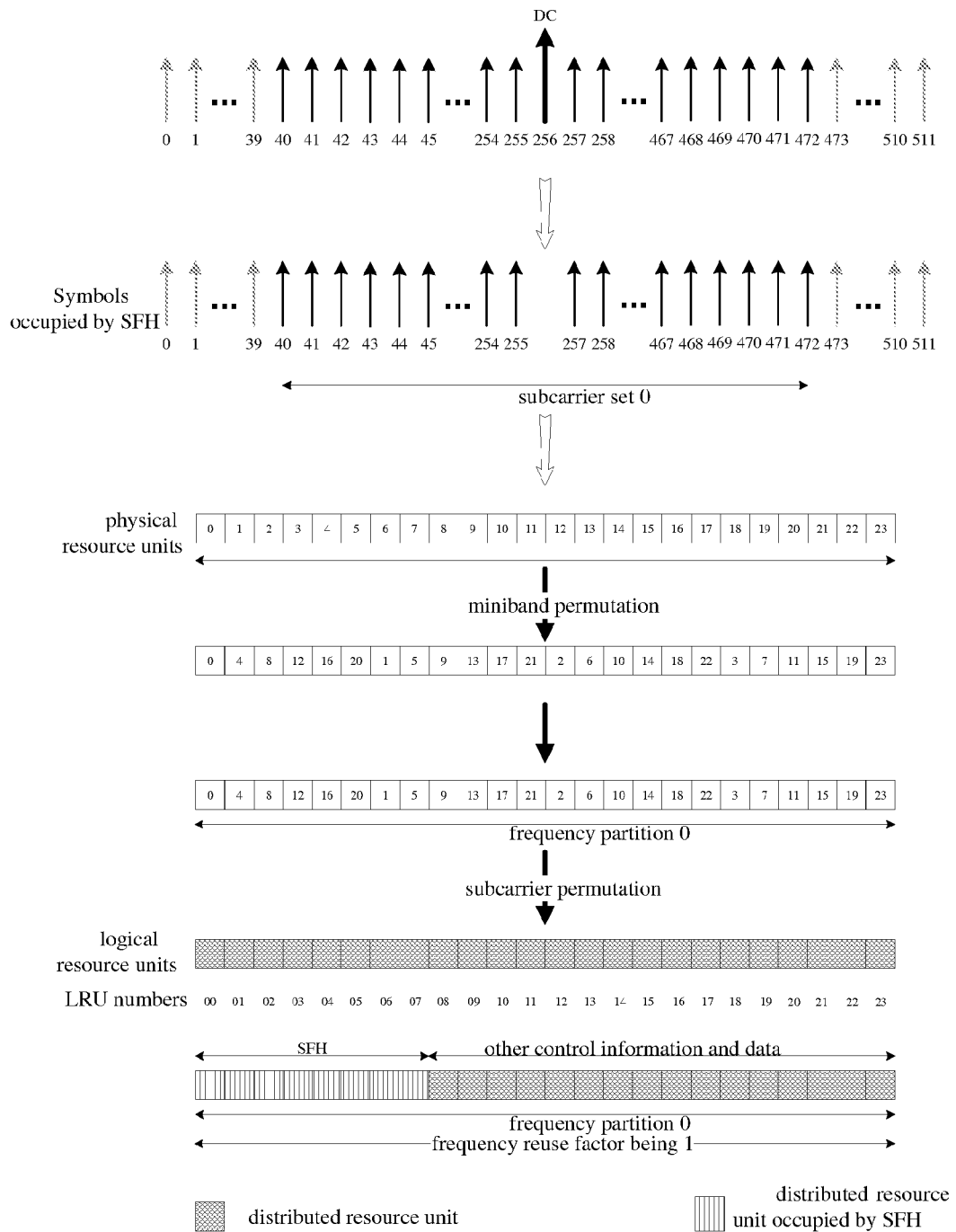
FIG. 9 is a schematic diagram of Embodiment 7 of a method for mapping resources based on an OFDM/5 MHz system when the frequency reuse factor is 1 according to an embodiment of the present invention.

A method for mapping resources of an SFH in an OFDMA/5 MHz system when the frequency reuse factor is 1 is described in FIG. 9.

With the method for dividing the subcarriers described in Method Embodiment 2 above, 432 available subcarriers in the 5 MHz system are formed into one subcarrier set, available physical subcarriers are divided into physical resource units on which a miniband permutation is performed, and further the resource units after the miniband permutation is performed are formed into one frequency partition, and then a subcarrier permutation is performed on the resource units of the frequency partition to obtain distributed resource units.

As shown in FIG. 9, the SFH occupies one or more distributed resource units starting from the lowest distributed resource unit index in the frequency partition, and remaining distributed resource units are used for transmitting control information and data.

Example 8

Figure 10:
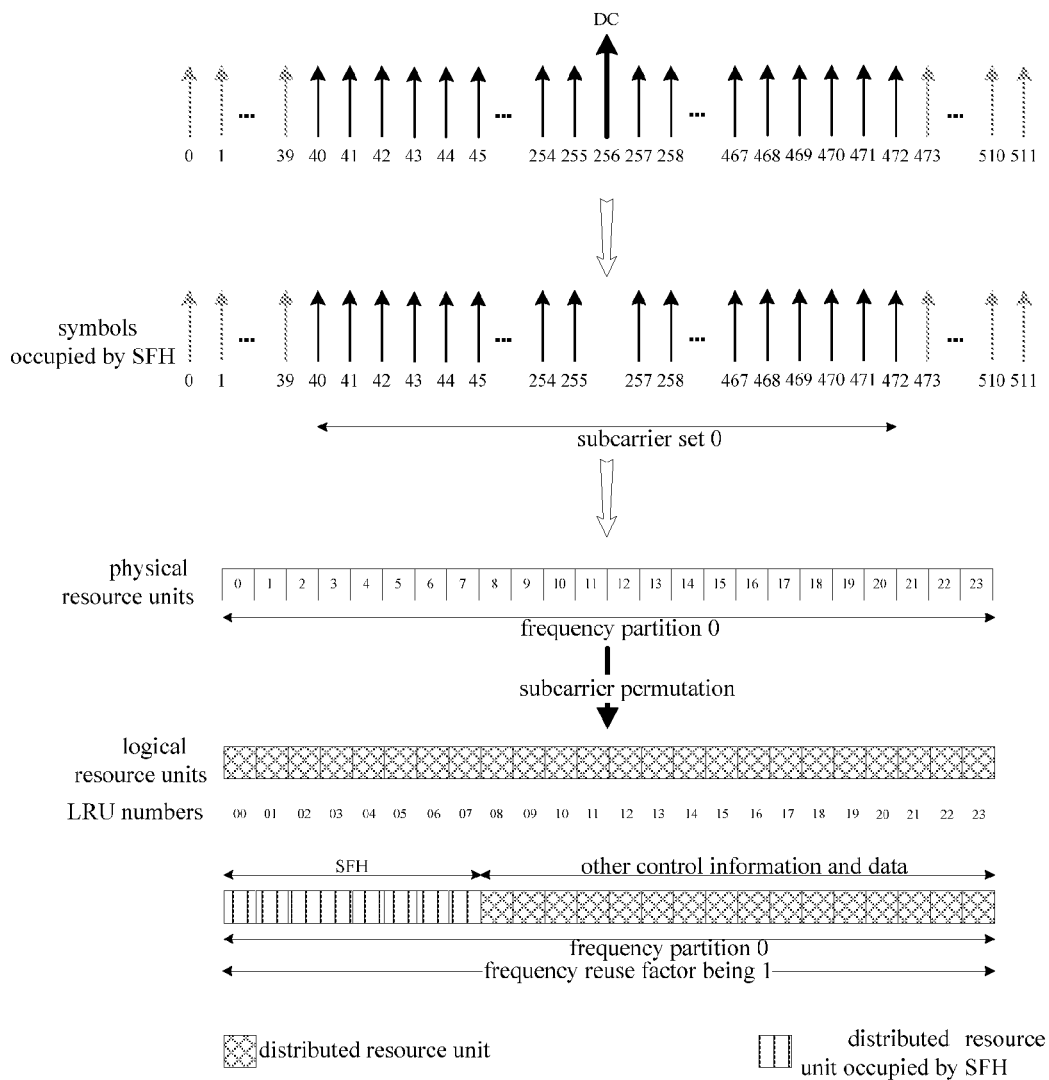
FIG. 10 is a schematic diagram of Embodiment 8 of a resource mapping method based on an OFDM/5 MHz system when the frequency reuse factor is 1 according to an embodiment of the present invention.

Preferably, in order to simplify system designing and accelerate decoding by a terminal, a simplified process can be used for mapping resources of an SFH. FIG. 10 shows another method for mapping resources of an SFH in an OFDMA/5 MHz system when the frequency reuse factor is 1.

Compared with FIG. 9, a miniband permutation is not needed in a process shown in FIG. 10. As shown in FIG. 10, a specific process is as follow: after available subcarriers are divided into one subcarrier set, subcarriers in the subcarrier set are divided into physical resource units, further, mapped resource units in the subcarrier set are formed into one frequency partition, and then a subcarrier permutation is performed on the resource units of the frequency partition to obtain distributed resource units.

Example 9

Figure 11:
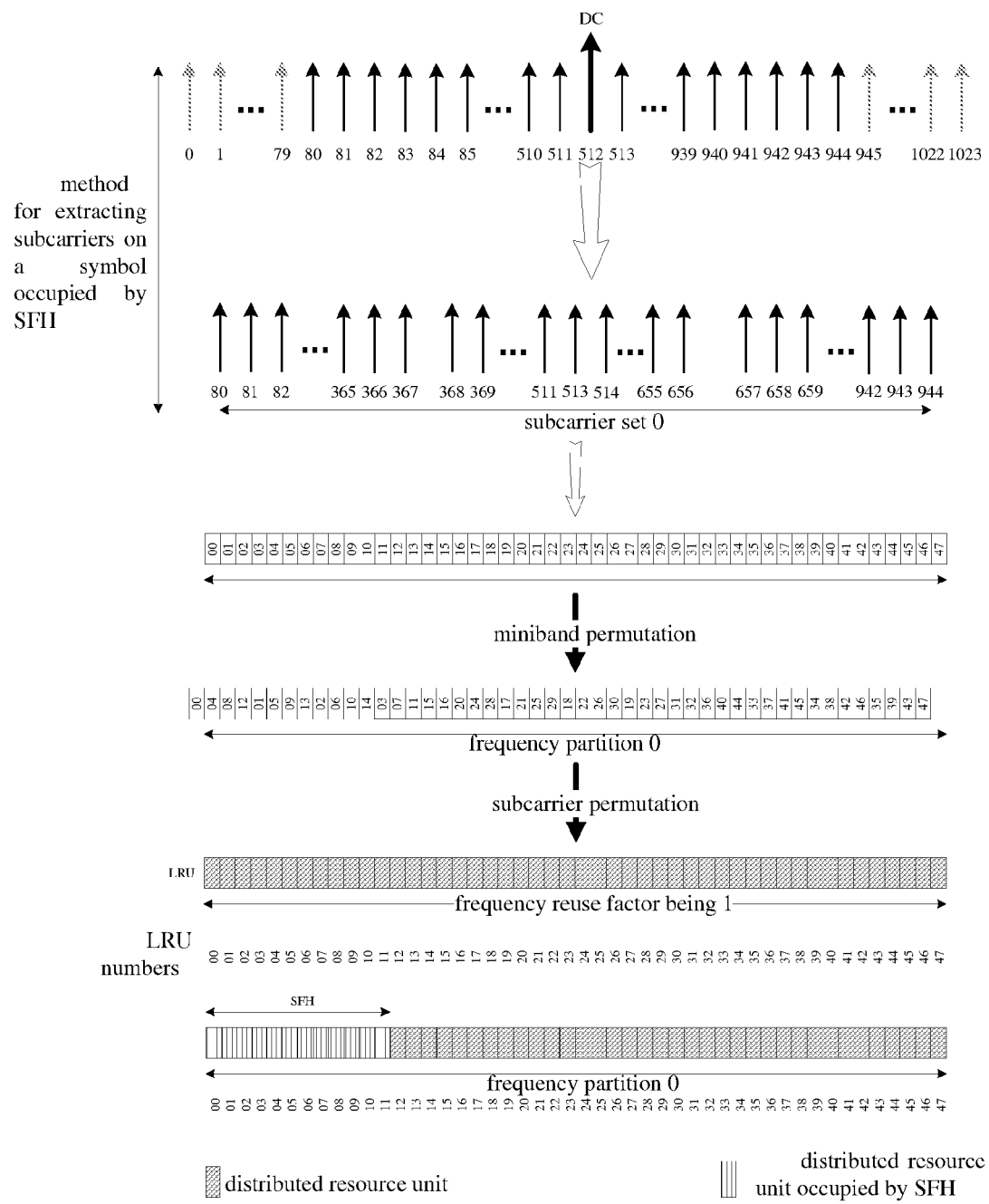
FIG. 11 and FIG. 12 are schematic diagrams of Embodiment 9 of a method for mapping resources based on an OFDM/10 MHz system when the frequency reuse factor is 1 according to an embodiment of the present invention.
Figure 12:
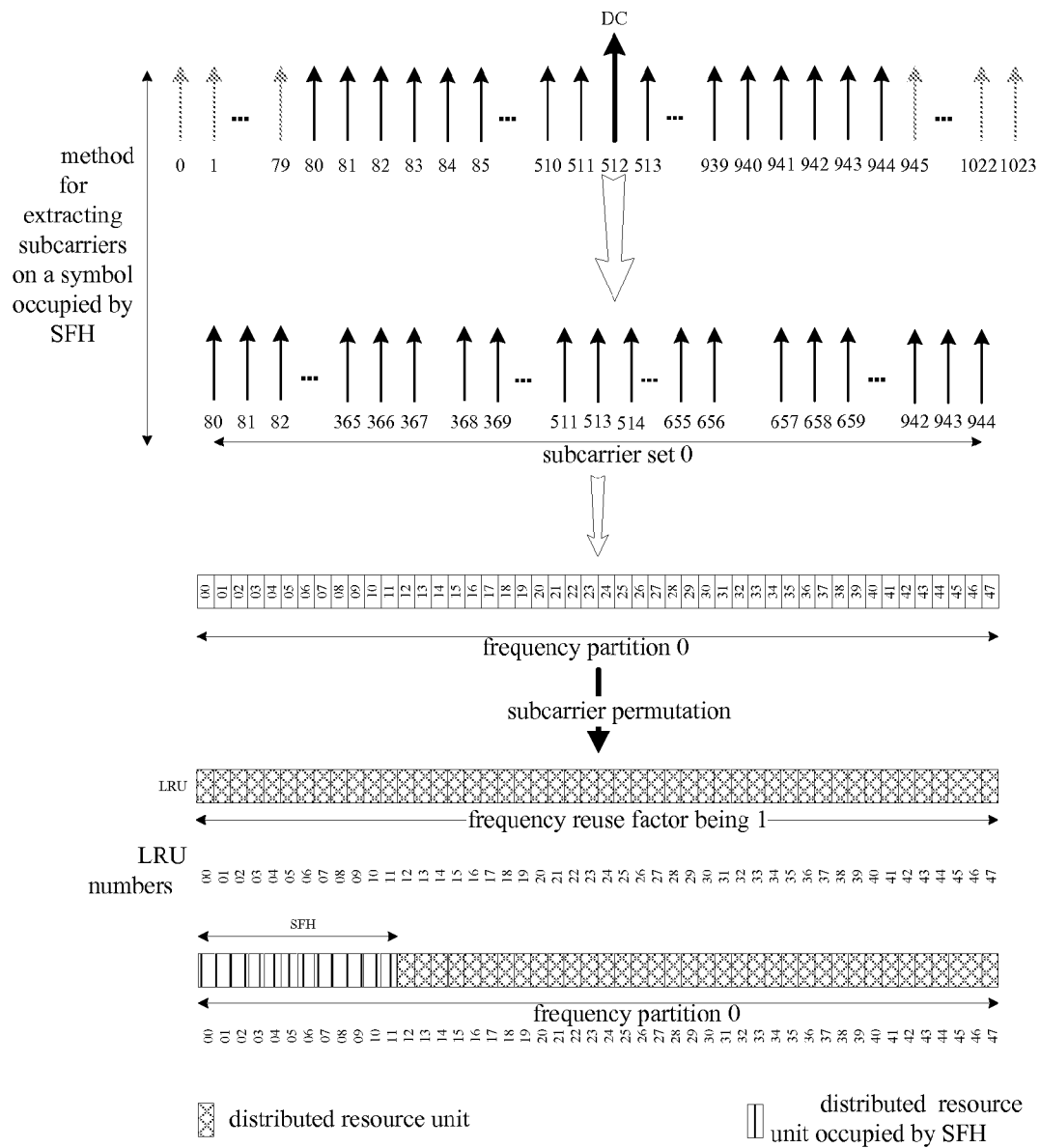

Similar to Example 7 and Example 8 above, FIG. 11 and FIG. 12 show two methods for mapping resources of an SFH in an OFDMA/10 MHz system when the frequency reuse factor is 1. Reference can be made to Example 7 and Example 8 for specific implementation details and unnecessary details will not be given herein.

With the above embodiments provided in the present invention, the resources of Broadcast Control Channel (SFH) are mapped, after which, preferably, the SFH occupies one or more distributed resource units starting from the lowest distributed resource unit index in each frequency partition, and remaining distributed resource units are used for transmitting control information and/or data. If the remaining resource units are used, and only used for transmitting data, then the control information is transmitted in a subframe in front of the subframe in which the SFH is located.

As the above mentioned, the SFH comprises a primary SFH and a secondary SFH, wherein the primary SFH occupies the distributed resource units in a fixed number, and the number of the distributed resource units occupied by the secondary SFH is indicated in the primary SFH.

Above description is only to illustrate the preferred embodiments but not to limit the present invention. Various alterations and changes to the present invention are apparent to those skilled in the art. Any modifications, equivalent substitutions, improvements etc. within the spirit and principle of the present invention should be concluded in the scope protected of the present invention.

The invention claimed is:

1. A method for mapping resources of broadcast control channel, comprising:
   dividing available subcarriers of a subframe in which the broadcast control channel is located into three subcarrier sets, each of which is mapped to be one frequency partition, so that the subframe in which the broadcast control channel is located comprises three frequency partitions, and
   mapping resources of each frequency partition to be logical resource units,
   wherein the available subcarriers are divided into the three subcarrier sets according to one of the following:
   dividing the available subcarriers into a plurality of subblocks by taking N subcarriers as a unit, and performing an equal interval extraction on subcarriers of each subblock to form the three subcarrier sets, wherein N is a natural number greater than 1;
   dividing the available subcarriers into the three subcarrier sets according to a permutation sequence; and
   equally dividing the available subcarriers to form the three subcarrier sets,
   wherein the logical resource units are distributed resource units, wherein mapping the resources of each frequency partition to the logical resource units comprises:
   dividing subcarriers in each subcarrier set into physical resource units and performing at least one of the following operations on the physical resource units to obtain the logical resource units : microstrip permutation and subcarrier permutation, or
   performing a subcarrier permutation on the subcarriers in each subcarrier set to obtain the logical resource units;
   wherein the method further comprises:
   after mapping the resources of each frequency partition to the logical resource units, occupying by the broadcast control channel a plurality of the distributed resource units starting from a lowest distributed resource unit index in each frequency partition, wherein the broadcast control channel comprises a primary broadcast control channel and a secondary broadcast control channel,
   wherein the primary broadcast control channel occupies the distributed resource units in a fixed number, and the number of the distributed resource units occupied by the secondary broadcast control channel is indicated in the primary broadcast control channel.

2. The method according to claim 1, wherein an offset between an initial subcarrier and the first subcarrier of a subblock is M subcarriers when the equal interval extraction is performed in the subblock, and offsets in different subblocks can be the same or not, wherein M is a nonnegative integer.

3. The method according to claim 1, wherein the dividing method for the three subcarrier sets is the same as a dividing method for three subcarrier sets in a secondary synchronization channel.

4. The method according to claim 1, wherein the dividing method for the three subcarrier sets is different from a dividing method for three subcarrier sets in a secondary synchronization channel.

5. The method according to claim 1, wherein the logical resource units are distributed resource units and continuous resource units, wherein the step of the resources of each frequency partition being mapped to the logical resource units comprises:
   dividing subcarriers in each subcarrier set into physical resource units and performing at least one of the following operations on the physical resource units to obtain the logical resource units : microstrip permutation, continuous resource unit/distributed resource unit allocation and subcarrier permutation.

6. The method according to claim 1, wherein:
   the resource units in each frequency partition except for the resource units occupied by the broadcast control channel are configured to transmit control information and/or data, wherein if the resource units in each frequency partition except for the resource units occupied by the broadcast control channel are only used to transmit the data, then the control information is transmitted in a subframe in front of the subframe in which the broadcast control channel is located.

7. The method according to claim 2, wherein the dividing method for the three subcarrier sets is the same as a dividing method for three subcarrier sets in a secondary synchronization channel.

8. The method according to claim 1, wherein the dividing method for the three subcarrier sets is different from a dividing method for three subcarrier sets in a secondary synchronization channel.

9. The method according to claim 1, wherein the logical resource units are distributed resource units, wherein the step of resources of each frequency partition being mapped to the logical resource units comprises:
   dividing subcarriers in each subcarrier set into physical resource units and performing at least one of the following operations on the physical resource units to obtain the logical resource units: miniband permutation and subcarrier permutation; or
   performing a subcarrier permutation on the subcarriers in each subcarrier set to obtain the logical resource units.

10. The method according to claim 2, wherein the logical resource units are distributed resource units, wherein the step of resources of each frequency partition being mapped to the logical resource units comprises:
    dividing subcarriers in each subcarrier set into physical resource units and performing at least one of the following operations on the physical resource units to obtain the logical resource units : miniband permutation and subcarrier permutation; or performing a subcarrier permutation on the subcarriers in each subcarrier set to obtain the logical resource units.

11. The method according to claim 1, wherein the logical resource units are distributed resource units and continuous resource units, wherein the step of the resources of each frequency partition being mapped to the logical resource units comprises:

dividing subcarriers in each subcarrier set into physical resource units and performing at least one of the following operations on the physical resource units to obtain the logical resource units : miniband permutation, continuous resource unit/distributed resource unit allocation and subcarrier permutation.

12. The method according to claim 2, wherein the logical resource units are distributed resource units and continuous resource units, wherein the step of the resources of each frequency partition being mapped to the logical resource units comprises:

dividing subcarriers in each subcarrier set into physical resource units and performing at least one of the following operations on the physical resource units to obtain the logical resource units : miniband permutation, continuous resource unit/distributed resource unit allocation and subcarrier permutation.

* * * * *